United States Patent [19]
Leo et al.

[11] 3,891,239
[45] June 24, 1975

[54] HYDRAULICALLY OPERATED HITCH FOR TOWING AND POSITIONING MOBILE HOMES

[76] Inventors: Jack D. Leo, 2045 Winton Ave., Speedway, Ind. 46224; Lee Benedict, R.R. 2, Box 167, Camby, Ind. 46113

[22] Filed: Apr. 15, 1974

[21] Appl. No.: 460,713

[52] U.S. Cl............. 280/479 R; 280/468; 280/490
[51] Int. Cl............................................. B62d 53/04
[58] Field of Search.... 280/467, 468, 479 R, 490 R, 280/456

[56] References Cited
UNITED STATES PATENTS

| | | | |
|---|---|---|---|
| 2,771,306 | 11/1956 | Ash | 280/468 X |
| 3,172,685 | 3/1965 | Mandekic | 280/470 X |

FOREIGN PATENTS OR APPLICATIONS

| | | | |
|---|---|---|---|
| 609,399 | 5/1926 | France | 280/470 |
| 227,859 | 11/1958 | Australia | 280/468 |
| 822,472 | 11/1951 | Germany | 280/468 |

*Primary Examiner*—Leo Friaglia
*Attorney, Agent, or Firm*—Woodard, Weikart, Emhardt & Naughton

[57] ABSTRACT

A tractor truck is provided with a pivoting frame extending from the rear, and having a hitching ball mounted thereon and laterally shiftable by a hydraulic actuator. The frame itself is movable up or down about a horizontal axis, by a hydraulic actuator, to move the hitching ball up or down. Locking pins are provided to unload the actuator cylinders during over-the-road operation.

11 Claims, 6 Drawing Figures

PATENTED JUN 24 1975　　3,891,239

SHEET 1

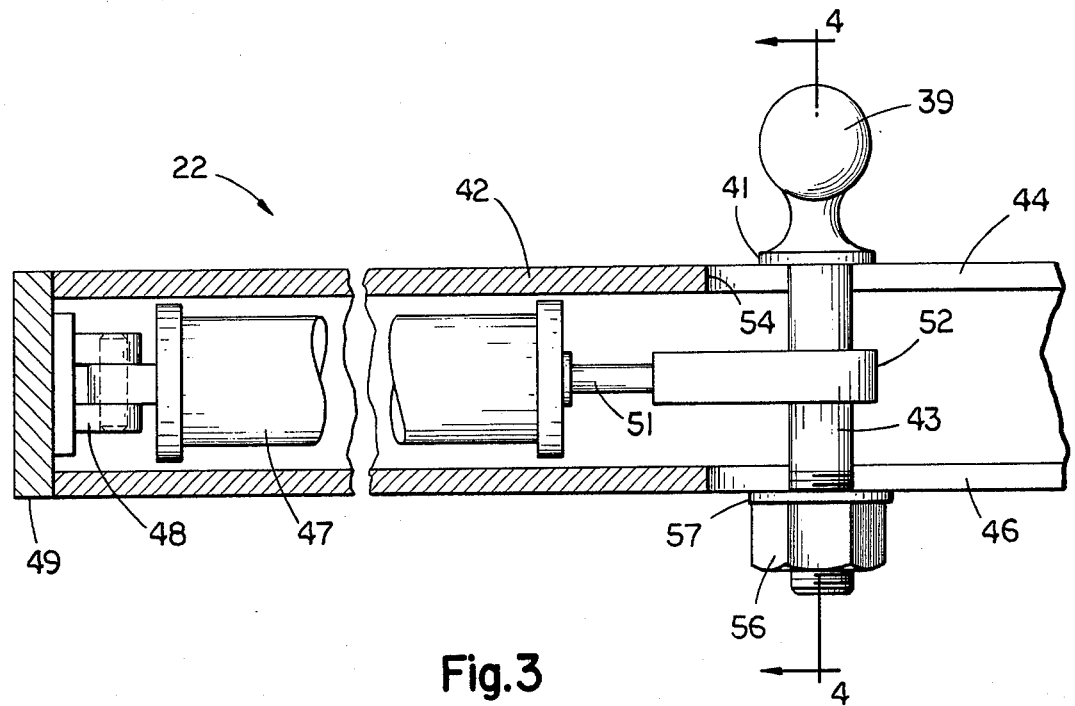
Fig. 3
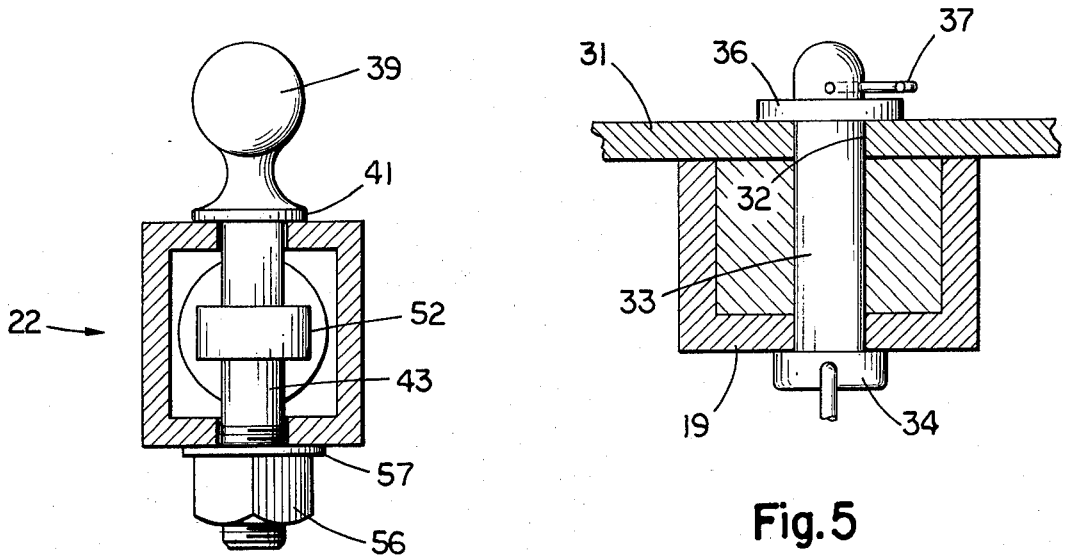
Fig. 4
Fig. 5

3,891,239

HYDRAULICALLY OPERATED HITCH FOR TOWING AND POSITIONING MOBILE HOMES

BACKGROUND OF THE INVENTION

1. Field of the Invention

This invention relates generally to trucks and trailers, and more particularly to trucks designed expressly for towing mobile homes.

2. Description of the Prior Art

It is common for independent contractors, or others whose task it is to move mobile homes from place-to-place, to employ so-called "bob-tailed" tractor trucks to tow mobile homes from the manufacturing plant to the dealer or to a mobile home park or elsewhere. Such trucks are similar to those employed for towing semi-trailers, except that they are shorter, do not have a fifth wheel on them, but instead employ some kind of structure to which a hitching ball is secured. A ball-receiving socket on the towing tongue of the mobile home is connected to the ball for towing the mobile home.

Some patents have been granted disclosing adjustable hitches for such trucks to accommodate variations in height of towing tongues from one trailer to another. Examples known to us are U.S. Pat. Nos. as follows:

| 3,269,751 | Whattoff | Aug. 30, 1966 |
| 3,400,949 | Kendall | Sept. 10, 1968 |
| 3,655,221 | Warner | Apr. 11, 1972 |
| 3,708,183 | Jones | Jan. 2, 1973 |

While these patents show means for adjusting or changing the vertical height of the towing hitch ball on the truck, they seem to contemplate doing so without any load on the ball. Yet it is seldom very convenient to get the ball hitch socket of a mobile home towing tongue, up onto the ball. Furthermore, it is not easy to get the towing socket off the ball at the delivery site. In addition, where the delivery site is a mobile home part, very often it is necessary to fairly precisely locate the mobile home on blocks, pylons, or adjacent or over a concrete pad or the like. This often involves the labor of three or four men, the use of mechanical jacks, and sometimes involves using chains and/or other vehicles to pull the mobile home sidewards, or otherwise, to obtain the necessary positioning. Our invention is intended to minimize or avoid such problems.

SUMMARY OF THE INVENTION

Described briefly, in a typical embodiment of the present invention, a frame adapted to movable mounting to the rear of a tractor truck, is provided with a towing ball at the rear thereof, with power operable means for laterally shifting the ball with respect to the frame, and power-operable means for moving the ball up and down with respect to the truck. Also means are provided for locking the ball in a selected position, to unload the power driven means during transportation of a mobile home, for example, by the truck.

BRIEF DESCRIPTION OF THE DRAWINGS

FIG. 3 is a section taken at line 3—3 in FIG. 2 and viewed in the direction of the arrows, and enlarged, to show the horizontal actuator for the hitching ball.

FIG. 4 is a section taken at line 4—4 in FIG. 3 and viewed in the direction of the arrows and showing the typical cross section of the rear cross member of the towing frame.

FIG. 5 is a section taken at line 5—5 in FIG. 1, and enlarged to show the pin locking of the towing frame to the truck.

DESCRIPTION OF THE PREFERRED EMBODIMENT

Figure 1:
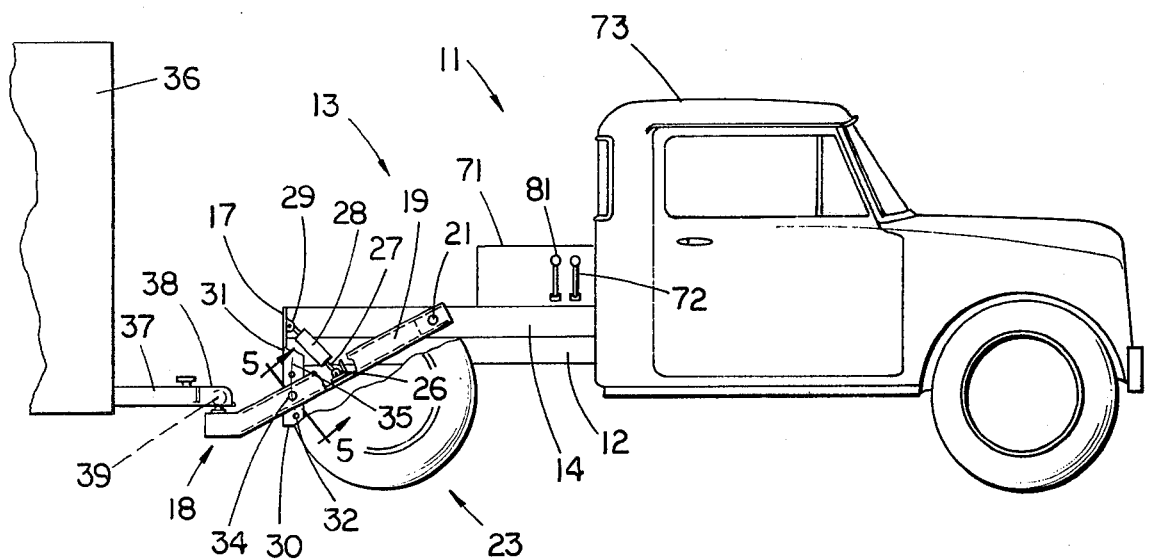
FIG. 1 is a side elevational view of a tractor truck towing a mobile home (shown fragmentarily) with a hitch according to a typical embodiment of our invention.
Figure 2:
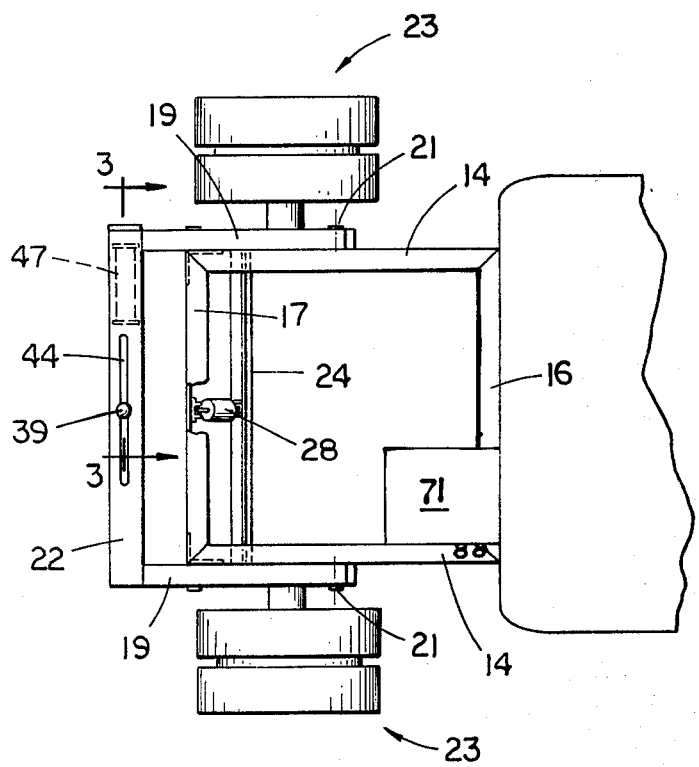
FIG. 2 is a top plan view thereof.

Referring now to the drawings in detail, the tractor truck 11 has a chassis frame 12 to which is affixed (typically by welding) an upper mounting frame 13 having side members 14 and front and rear cross members 16 and 17, respectively. A towing frame 18 includes side members 19 pivotally mounted to the side members 14 of the upper frame 13 to pivot about a horizontal axis 21 when driven by a hydraulic servomotor in the form of a hydraulic cylinder-piston assembly. A rear frame cross member 22 is affixed to the rear ends of the towing frame side members 19, extending across the vehicle parallel to the upper frame cross members 16 and 17, and to the pivot axis 21. Although the side members of this towing frame are immediately outside the truck frame and upper frame, they are inboard of the two dual wheel assemblies 23 of the truck.

An intermediate cross member 24 is affixed to the tiltable towing frame side members 19 and a bracket 26 at the center of this cross member serves as a pin connector means for the piston rod 27 of the double acting lift cylinder 28, the upper end of which is pinned to a bracket 29 affixed to the rear cross member 17 of the frame 14.

Angle sections are welded to the rear corners of the upper frame 13 and project downwardly therefrom. A lower crossmember 30 is welded and gusseted to the lower ends of these angle sections and maintains the spacing between the lower ends thereof and the squareness thereof to the frames 12 and 13. The sides of these angle sections serve as side plates 31 at each side of the truck frame 12. Each of these plates has three apertures 32 therein spaced on an arc 35 about the pivot axis 21 of the side members 19. As is best shown in FIG. 5, such apertures are provided to receive lock pins 33 passed through the side members 19 of the tiltable towing frame and retained by the pin head 34 outboard of the aperture in the side member 19 and by the washer 36 and hairpin clip 37 inboard of the plate 31. These pins, one of which is employed at each side member 19, serve to lock the towing frame in any one of the three possible positions to thereby remove impact loads from the cylinder 28 during towing of the mobile home 36 (shown fragmentarily behind the truck 11).

The towing tongue 37 on the mobile home has a conventional socket 38 received on a towing hitch ball 39 supported by a flange 41 thereof resting on top of the top wall 42 of the rear frame cross member 22. The ball serves as the upper end of a bolt 43 which extends vertically downward through horizontally extending slots 44 and 46 in the upper and lower walls of the box-shaped cross section of the rear frame cross member 22 as is best shown in FIGS. 3 and 4.

A hydraulic cylinder 47 is pinned to a bracket 48 affixed to the end wall 49 of the cross member 22. The piston rod 51 is pinned to the bolt 43 by the connector 52 through which the bolt passes, the connector typically being threaded onto the end of the piston rod 51. The rod is shown in FIG. 3 at nearly the fully retracted position, whereby the ball hitch is toward the left-hand end 54 of the slot 44. By extension of the piston rod from the cylinder, the ball can be moved from the position shown in FIG. 3, for example, to the opposite end of the slot. A nut 56 threaded onto the lower end of the bolt 43 can be tightened against the washer 57 which tightens against the lower face of the bottom wall of the cross member 22, to affix the ball in whatever position is established by the cylinder, so that during towing the lateral forces exerted on the ball are not exerted on the piston-cylinder assembly, thereby avoiding wear and tear on it.

Figure 6:
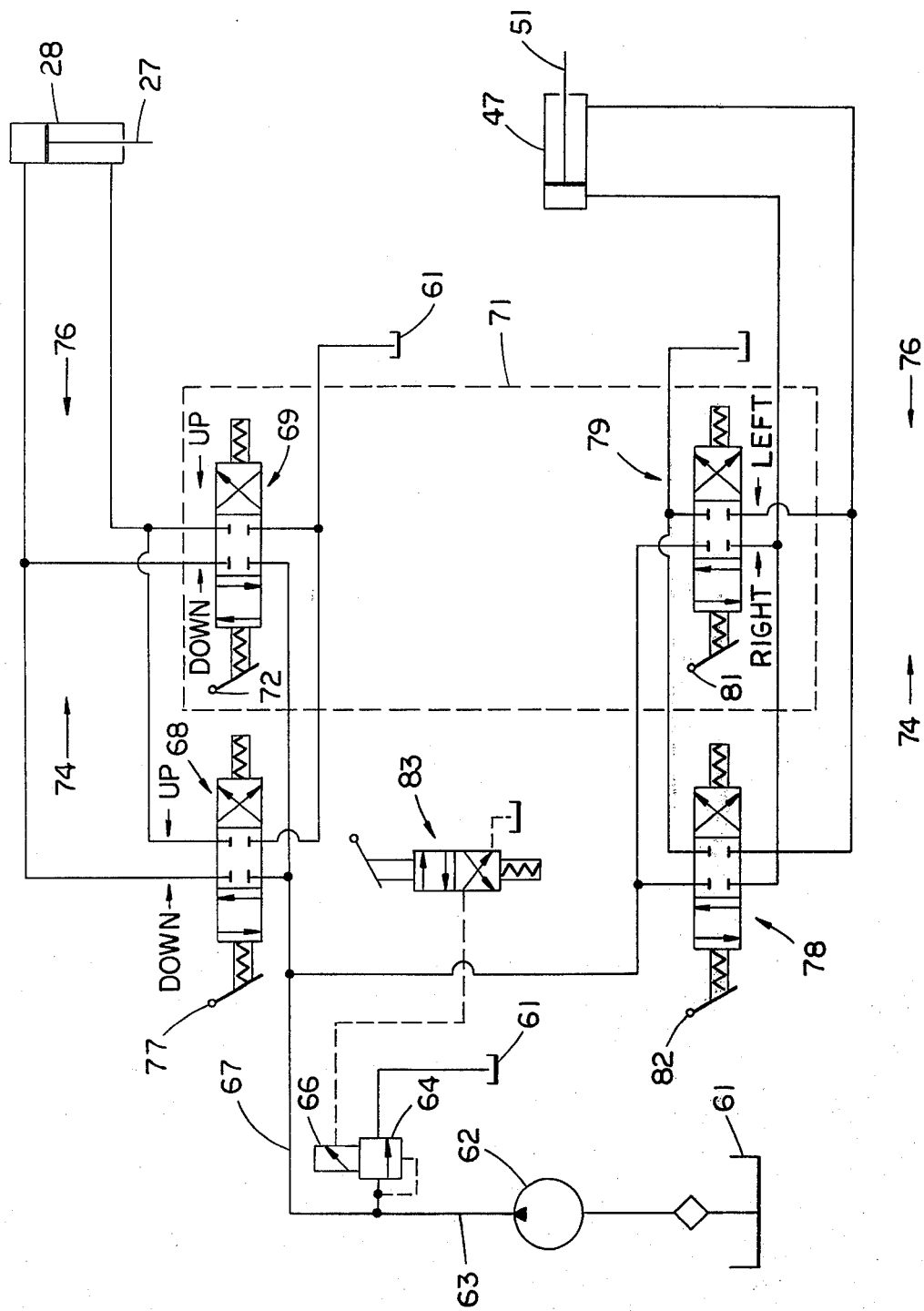
FIG. 6 is a schematic hydraulic diagram of the control circuits for the apparatus.

Referring now to the schematic hydraulic diagram of FIG. 6, the lift cylinder is shown at 28, and the shift cylinder is shown at 47. Both of these are supplied by hydraulic fluid through appropriate valving. In the illustrated example, a reservoir is shown at 61 from which the pump 62 takes hydraulic fluid and raises the pressure to approximately two thousand pounds per square inch at two gallons per minute in the output line 63. A pressure relief valve is provided at 64, and is adjustable as indicated at 66. The high pressure line 67 supplies two valves 68 and 69 for the lift cylinder 28. The reason for showing two valves is the fact that one of the valves is in the cab of the truck and the other of the valves is in the control box 71 of FIG. 1. Therefore, as shown in the drawing by the dotted outline 71, the valve 69 is in the control box and may have an operating handle on the side of the box as indicated by the numeral 72, for example. When either valve 68 or 69 is shifted to the right in the direction of arrow 74 in FIG. 6, hydraulic fluid is applied above the piston in the lift cylinder, and drained from below it to the reservoir 61, so that piston rod, and therefore the towing frame, can descend. When the lever is released, the springs center the valve so that both ends of the cylinder are closed. When either of the valves is shifted to the left, in the direction of arrow 76 in FIG. 6, hydraulic fluid is supplied under pressure to the bottom of the piston and drained from above the piston in the cylinder 28, whereupon the piston rod is retracted and the towing frame and thereby the hitch ball, is raised. Either valve 68 in the cab 73 of the truck or valve 69 in the control box, can be manually operated to perform these functions. Upon release of the handle 72 for valve 69, that valve will be self-centered by the springs. Likewise, upon release of handle 77 of valve 68, that valve will be self-centering.

For the horizontal shifting cylinder 47, valves 78 and 79 are employed in the cab and control box 71, respectively. A handle 81 is shown for valve 79 and when it is used to shift the valve spool to the right in the direction of arrow 74, high pressure is applied to the head-end of cylinder 47 to drive the piston rod out and thereby shift the ball to the right. When the control is pushed to the left to shift the valve to the left in the direction of arrow 76, the pressure is applied to the rod-end of the cylinder and shifts the ball to the left. At any time that the valve control handle is released, it too is self-centering, to provide a closed hydraulic circuit between the valve and cylinder, to lock the cylinder in whatever position it happens to be when the valve centers. The same action is true of valve 78 operated by the handle 82.

Referring further to FIG. 6, the valve 83 is provided to normally by-pass the control valves and return the pump output to the sump, thereby unloading the pump at all times except when it is desired to move the ball up or down, or from side-to-side.

The provision of double acting cylinders enables forcing the ball down as well as up, and in either direction sideways, if desired, as might be necessary in the event the components became coated with mud and/or ice and thereby sticky or frozen. In the use of the apparatus, to load a mobile home onto the unit, the pins 33 are removed from both sides of the towing frame and the cylinder 28 is operated to the extent needed to move the hitch ball to the desired level for reception under the socket of the towing tongue of the mobile home. Then the truck is backed to position the ball under the socket. If it is not directly under the socket, the nut 56 on the ball bolt 43 can be loosened and the cylinder 47 actuated as needed to move the ball sidewards or laterally to locate it directly under the socket. Then the lift cylinder is operated to raise the ball into the socket and raise the towing tongue to the desired level for towing. Then the pins 33 are re-installed in the registering apertures of the towing frame and side support plates 31.

Then the cylinder 47 may be actuated to return the ball to the centered position on the cross member 22, and then the nut 56 is tightened again.

Upon reaching the destination, the action is reversed, and the mobile home can be tipped and shifted to some extent sidewards by the selective operation of the hydraulic cylinders 28 and 47 to place the mobile home squarely in the desired position at the installation or delivery site.

Although variations in sizes may be employed according to the particular tractor truck to be used, or according to other facts having a bearing on selections, a 5 inch diameter lift cylinder having a 32 inch stroke is satisfactory. For the shifting cylinder, 2½ inch diameter cylinder with an 18 inch stroke is appropriate in most instances. Of course, other specifications might be employed.

While the invention has been disclosed and described in some detail in the drawings and foregoing description, they are to be considered as illustrative and not restrictive in character, as other modifications may readily suggest themselves to persons skilled in this art and within the broad scope of the invention.

The invention claimed is:

1. Apparatus for towing and positioning mobile homes, comprising:

a tractor truck having a rear axle;
 a hitching ball;
 a towing frame pivotably mounted to said truck, said frame having said ball mounted to the rear end thereof behind said truck, and said frame having its pivotal mounting to said truck ahead of the rear axle of the truck;
 a fluid driven actuator connected to said truck and to said frame and operable to raise said frame for lifting a towing tongue of a mobile home when connected to said ball;
 the pivotal mounting of said frame to said truck being ahead of the rear axle and sufficiently above the rear axle to locate said ball close to the rear end of said truck and enable said fluid driven actuator to raise and lower said ball through various levels near the level of the rear axle of said truck, without interference of said frame with said axle.

2. The apparatus of claim 1 and further comprising:
lock means on said truck and said frame for locking a position of said frame on said truck during transportation of a mobile home by said truck.

3. The apparatus of claim 1 and further comprising:
horizontal adjustment means of said frame and connected to said ball for horizontal movement of said ball on said frame.

4. The apparatus of claim 3 wherein:
said adjustment means include a second fluid driven actuator on said frame and connected to said ball and operable to move said ball laterally on said frame for lateral shifting of a mobile home when mounted to said ball.

5. Apparatus for towing and positioning mobile homes, comprising:
a tractor truck;
a hitching ball;
a towing frame pivotably mounted to said truck, said frame having said ball mounted to the rear end thereof behind said truck;
a fluid driven actuator connected to said truck and to said frame and operable to raise said frame for lifting a towing tongue of a mobile home when connected to said ball;
horizontal adjustment means on said frame and connected to said ball for horizontal movement of said ball on said frame, said adjustment means including a second fluid driven actuator on said frame and connected to said ball and operable to move said ball laterally on said frame for lateral shifting of a mobile home when mounted to said ball,
said truck including a rear cross member thereon, and said frame including an intermediate cross member thereon, the rear cross member being behind a horizontal pivot axis of said frame, the first mentioned of said actuators being connected between said rear cross member and said intermediate cross member.

6. The apparatus of claim 5 wherein:
said frame includes a rear cross member, said frame rear cross member having a box shaped cross section, with said second actuator disposed therein and extending along the axis of said box shaped cross member, said ball having a bolt affixed thereto and extending downwardly therefrom, said bolt extending vertically through upper and lower parallel longitudinally extending slots in upper and lower walls, respectively, of said box shaped section.

7. The apparatus of claim 6 wherein:
said actuator is a hydraulic servomotor having a cylinder member and a piston rod member, one of said members being connected to said rear frame cross member and the other of said members being connected to said bolt.

8. The apparatus of claim 7 wherein:
said bolt has a nut secured to the lower end thereof and snuggly engaging said rear frame cross member to prevent shifting of said bolt laterally in said rear frame cross member during transportation of a mobile home having a tongue mounted on said ball.

9. Apparatus for facilitating the towing and positioning of a mobile home and comprising:
a hitching member;
a towing frame having pivot mounting means thereon adjacent the front end thereof for pivotably mounting to a truck, said hitching member being attached to the towing frame, adjacent the rear end thereof;
a fluid driven actuator connected to said frame at a point intermediate the ends thereof and connectable to a truck to raise said frame for lifting a towing tongue of the mobile home when connected to said hitching member, horizontal shifing means connected to said frame and to said hitching member for lateral shifting of said member with respect to said frame,
a mounting frame having longitudinal side members spaced for superimposed attachment to chassis frame side members of a truck, said pivot mounting means of said towing frame being mounted pivotally to said mounting frame side members, and said actuator being connected to said mounting frame above and to the rear of the point of connection of said actuator of said towing frame.

10. The apparatus of claim 9 wherein:
said shifting means include a second fluid driven actuator, the apparatus further comprising:
a hydraulic control box mounted on said mounting frame in front of said pivot mounting means and having therein first and second hydraulic control valves for controlling the first mentioned and second mentioned actuators, respectively.

11. Apparatus for facilitating the towing and positioning of a mobile home and comprising:
a hitching member;
a towing frame having pivot mounting means thereon for pivotably mounting to a truck, said hitching member being attached to the towing frame;
a fluid driven actuator connected to said frame and connectable to a truck to raise said frame for lifting a towing tongue of the mobile home when connected to said hitching member;
horizontal shifting means connected to said frame and to said hitching member for lateral shifting of said member with respect to said frame;
a mounting frame having longitudinal side members for attachment to chassis frame side members of a truck, said pivot mounting means of said towing frame being mounted pivotally to said mounting frame side members,
said shifting means including a second fluid driven actuator;
a hydraulic control box mounted on said mounting frame in front of said pivot mounting means and having therein first and second hydraulic control valves for controlling the first mentioned and second mentioned actuators, respectively;
side members on said mounting frame and affixed to the rear ends of said longitudinal side members and depending therefrom, said plates having a plurality of spaced apertures therein located in an arc about the axis of said pivot mounting means;
said towing frame including an intermediate cross member and a rear cross member, said rear cross member having a box-shaped cross section, the upper and lower walls having slots extending parallel to the length of the cross member and vertically align with each other;
said hitching member being a hitch ball having a bolt extending downwardly therefrom through said slots and receiving a tightening nut on the lower end thereof engaging the lower face of the lower wall of said box-shaped cross section;

said mounting frame having a rear cross member, said actuator being a hydraulic cylinder assembly having a cylinder member and a piston rod member, one of said members being connected to the rear cross member of said mounting frame, and the other of said members being connected to said intermediate member of said towing frame and said assembly being operable, when actuated, to raise and lower said ball about the horizontal axis of said pivot means;

said second actuator including a hydraulic cylinder and piston assembly including a cylinder member and piston rod member, one of said members of said second actuator being connected to said rear cross member of said towing frame, and the other of said member of said second actuator being connected to said ball, the cylinder thereof being disposed inside the box-shaped cross section of said cross member and extend parallel to the length thereof, said second actuator being operable, when actuated, to move said ball lengthwise of said rear towing frame cross member and thereby laterally with respect to the combination of said towing frame and mounting frame and the vehicle to which said mounting frame is to be mounted;

and pin means received through side members of said towing frame and into apertures in said side members of said mounting frame, to lock a selected position of said towing frame with respect to said mounting frame.

* * * * *